United States Patent [19]
Iizuka

[11] Patent Number: 5,577,979
[45] Date of Patent: Nov. 26, 1996

[54] SHIFT SHOCK SUPPRESSING SYSTEM FOR AUTOMOTIVE POWER TRAIN

[75] Inventor: Naonori Iizuka, Fuji, Japan

[73] Assignee: Jatco Corporation, Fuji, Japan

[21] Appl. No.: 387,122

[22] Filed: Feb. 13, 1995

[30] Foreign Application Priority Data

Feb. 15, 1994 [JP] Japan ................................. 6-018334

[51] Int. Cl.⁶ .................................................. B60K 41/04
[52] U.S. Cl. ......................................... 477/109; 477/110
[58] Field of Search ................................. 477/109, 110, 477/111, 107

[56] References Cited

U.S. PATENT DOCUMENTS

| | | |
|---|---|---|
| 4,744,031 | 5/1988 | Takeda et al. . |
| 4,868,753 | 9/1989 | Mori . |
| 4,938,100 | 7/1990 | Yoshimura et al. ............... 477/109 X |
| 5,012,695 | 5/1991 | Kyohzuka et al. ................ 477/110 X |
| 5,072,630 | 12/1991 | Kikuchi et al. .................... 477/109 X |
| 5,081,887 | 1/1992 | Kato . |
| 5,091,854 | 2/1992 | Yoshimura et al. ............... 477/109 X |
| 5,168,776 | 12/1992 | Otsubo et al. ........................ 477/109 |
| 5,184,577 | 2/1993 | Kato et al. ........................ 477/109 X |
| 5,211,680 | 5/1993 | Sumimoto et al. ................... 477/109 |
| 5,272,632 | 12/1993 | Noguchi et al. ................... 477/109 X |
| 5,323,667 | 6/1994 | Tweed et al. ........................ 477/107 |
| 5,433,676 | 7/1995 | Abe et al. ........................... 477/109 |

Primary Examiner—Charles A. Marmor
Assistant Examiner—Peter Kwon
Attorney, Agent, or Firm—Foley & Lardner

[57] ABSTRACT

When on-going down-shifting state of an automatic transmission is detected, an output torque of an engine is lowered after expiration of a first predetermined period, which is set between detection of down-shifting and a timing immediately before completion of down shifting, and for a second predetermined period which is set for a given period to completion of down-shifting from expiration of the first predetermined period to suppress a shift shock.

9 Claims, 9 Drawing Sheets

SHIFT SHOCK SUPPRESSING SYSTEM FOR AUTOMOTIVE POWER TRAIN

BACKGROUND OF THE INVENTION

1. Field of the Invention

The present invention relates to a shift shock suppressing system for an automotive power train including a prime mover, such as an internal combustion engine, and an automatic transmission.

2. Description of Related Art

One example of a shift shock suppressing or reducing technology has been disclosed in Japanese Patent Application Laid-open No. 45628/1990.

The conventional shift shock suppressing system, disclosed in the above-identified publication, has a torque varying means for varying the output torque of a prime mover, an input rotation speed sensor for detecting the input rotation speed and an output rotation speed sensor for detecting the output rotation speed of an automatic transmission, respectively, a transmission-ratio calculating means for deriving a nominal transmission-ratio on the basis of a ratio of input and output rotation speeds of the automatic transmission, and a shifting state discriminating means for discriminating on-going shifting state on the basis of the derived nominal transmission-ratio for effecting varying of the torque of the prime mover by the torque varying means.

In the above-mentioned shift shock suppressing system, a vehicle speed sensor, which is conventionally installed on the vehicle for generating a pulse train having a frequency proportional to the rotation speed of the output shaft of the automatic transmission, is employed as an output rotation speed sensor. Therefore, no cost and space problem will arise concerning the output rotation speed sensor. However, it is required to newly install a turbine sensor that generates a pulse train having a frequency proportional to the rotation speed of a turbine of a torque converter, as an input rotation speed sensor. This not only raises the cost for the turbine sensor but also creates a problem in installation space, making application for an existing automatic transmission difficult. In many cases, the additional installation of the turbine sensor requires design modifications for the input portion in the vicinity of the input shaft, such as a transmission casing, an oil pump and so forth.

SUMMARY OF THE INVENTION

In view of the problems set forth above in the prior art, it is an object of the present invention to provide a shift shock suppressing system that can precisely adjust the timing of a torque change during shifting operation without increasing costs.

In order to accomplish the above-mentioned objects, in accordance with the present invention, a shift shock suppressing system for an automotive power train including an engine and an automatic transmission mounted on a vehicle, comprising:

shifting control means for performing shift control for the automatic transmission depending upon an operating condition of the engine and a traveling condition of the vehicle;

torque varying means for varying an output torque of a prime mover;

shifting state detecting means for detecting shifting state of the automatic transmission that is controlled by the shift control means; and shift shock suppression control means for outputting a command lowering of the output torque of the engine to the torque varying means when initiation of down-shifting is detected by the shifting state detecting means and when a first predetermined period is elapsed from detection of initiation of down-shifting, and maintaining the command for a second predetermined period.

The first predetermined period may be preliminarily set to be a period from detection of initiation of down-shifting to a timing immediately before completion of down-shifting, and is stored in a memory. Also, the second predetermined period may be set to be a period from a timing immediately before completion of down-shifting to a predetermined timing after completion of down-shifting, and is stored in the memory.

At least one of the first and second predetermined periods may be preliminarily set corresponding to a load condition on the engine or a vehicle speed.

At least one of the first and second predetermined periods may be preliminarily set corresponding to a load condition of the engine and a vehicle speed.

At least one of the first and second predetermined periods may be preliminarily set corresponding to types of shifting of the automatic transmission.

In practice, at least one of the first and second predetermined periods may be preliminarily set to be longer at greater engine load condition and at higher vehicle speed, respectively.

The shift shock suppressing system may further comprise:

arithmetic means for deriving a variation rate of an engine speed after initiation of down-shifting;

judgement means for making judgement for completion of down-shifting on the basis of an input from the arithmetic means;

measuring means for measuring a shifting period as a period from initiation of down-shifting to completion of down-shifting as judged by the judgement means; and learning control means for modifying the first predetermined period with a value derived by subtracting a preliminarily set third predetermined period from the shifting period derived by the measuring means.

The judgement means may make judgement that down-shifting is completed when the current variation rate becomes smaller than the variation rate in the immediately preceding cycle.

By initiation of torque down immediately before completion of down-shifting, a shift shock can be suppressed. In the shift shock suppressing control, since the timing of initiation of torque down is determined on the basis of the elapsed time from initiation of the down-shifting control, the means for detecting the rotation speed of the input shift of the automatic transmission, such as a turbine sensor as required in the prior art, in which the torque down control is performed on the basis of the transmission-ratios of the automatic transmission, becomes unnecessary. Accordingly, production costs can be reduced by reduction of the number of required parts. Furthermore, since it does not require the input speed detecting means, installation space therefor becomes unnecessary, modification of the transmission casing, the oil pump and so forth becomes unnecessary so as to facilitate application of the present invention for the existing automatic transmission control systems. Therefore, further cost down can be expected.

Also, while the shown embodiment controls the timing of initiation of the torque down on the basis of the elapsed period from initiation of down-shifting control, since these predetermined periods are set on the basis of the vehicle speed and the throttle valve open angle, the timing of initiation of the torque down can be precisely adjusted relative to the completion timing of down-shifting. Furthermore, in the shown embodiment, since the first predetermined period for defining the initiation timing of the torque down operation is corrected through learning control at every occurrence of down-shifting, further precise initiation timing control for torque down can be achieved.

The above and other objects, effects features and advantages of the present invention will become more apparent from the following description of embodiments thereof taken in conjunction with the accompanying drawings.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of a shift shock suppressing system according to the present invention will be discussed with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail.

Figure 1:
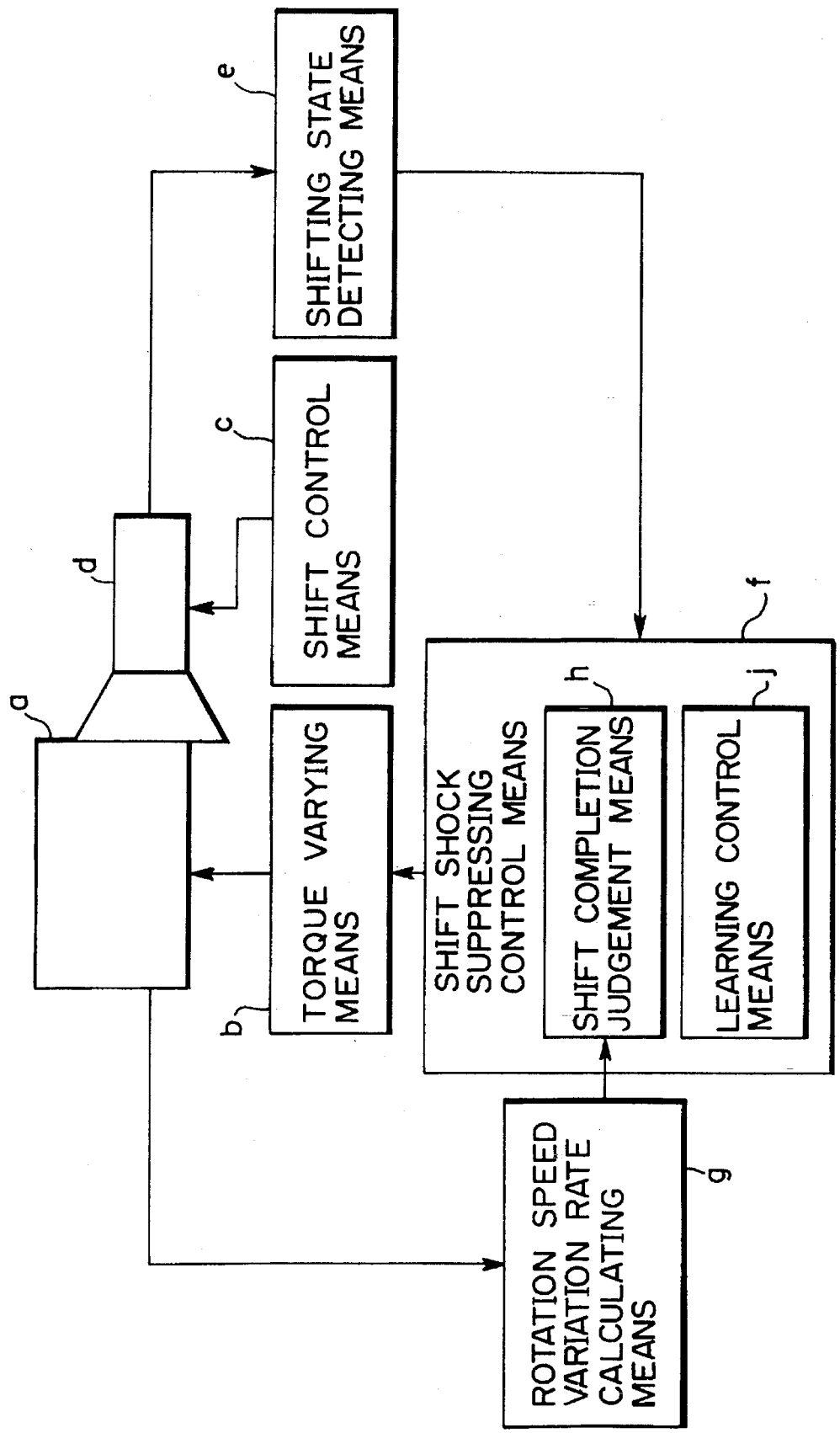
FIG. 1 is a schematic block diagram showing a shift shock suppressing system according to the present invention.

In advance of detailed discussion, the principle of a shift shock suppressing system for an automotive power train according to the present invention will be discussed briefly with reference to FIG. 1. As shown in FIG. 1, the shift shock suppressing system includes a torque varying means b for varying the output torque of a prime mover a, such as an internal combustion engine. A shifting state detecting means e is associated with an automatic power transmission d, which is shifted for selecting one of a plurality of transmission-ratios, for discriminating or detecting an on-going shifting state of the transmission-ratio from one to another under control by a shift control means c. A shift shock suppression control means f is responsive to the shifting state discriminating means to detect or discriminate on-going down-shifting state and reduces the output torque of the prime mover a after expiration of a first period, which is set between a detection of a down-shifting and a timing immediately before completion of the down-shifting, and a second period, which is set for a given period after completion of the down-shifting.

The first and second predetermined periods may be set depending upon a type of shifting. Alternatively, the shift shock suppressing means f may set the first and second predetermined periods depending upon an engine load condition. In the further alternative, the first and second predetermined periods may be set depending upon an instantaneous vehicle speed.

In the alternative, an engine speed variation rate calculating means g may be provided for measuring a variation rate of an engine speed after initiation of the down-shifting. The system is also provided with a shifting completion judgement means h for making judgement of completion of the down-shifting on the basis of the input from the engine speed variation rate calculating means. The system may be further provided with a learn controlling means j for measuring a shifting period, i.e. from initiation of down-shifting to completion thereof, and adjusting the first predetermined period so that the first predetermined period becomes a value derived by subtracting a third predetermined period from the shifting period.

Figure 2:
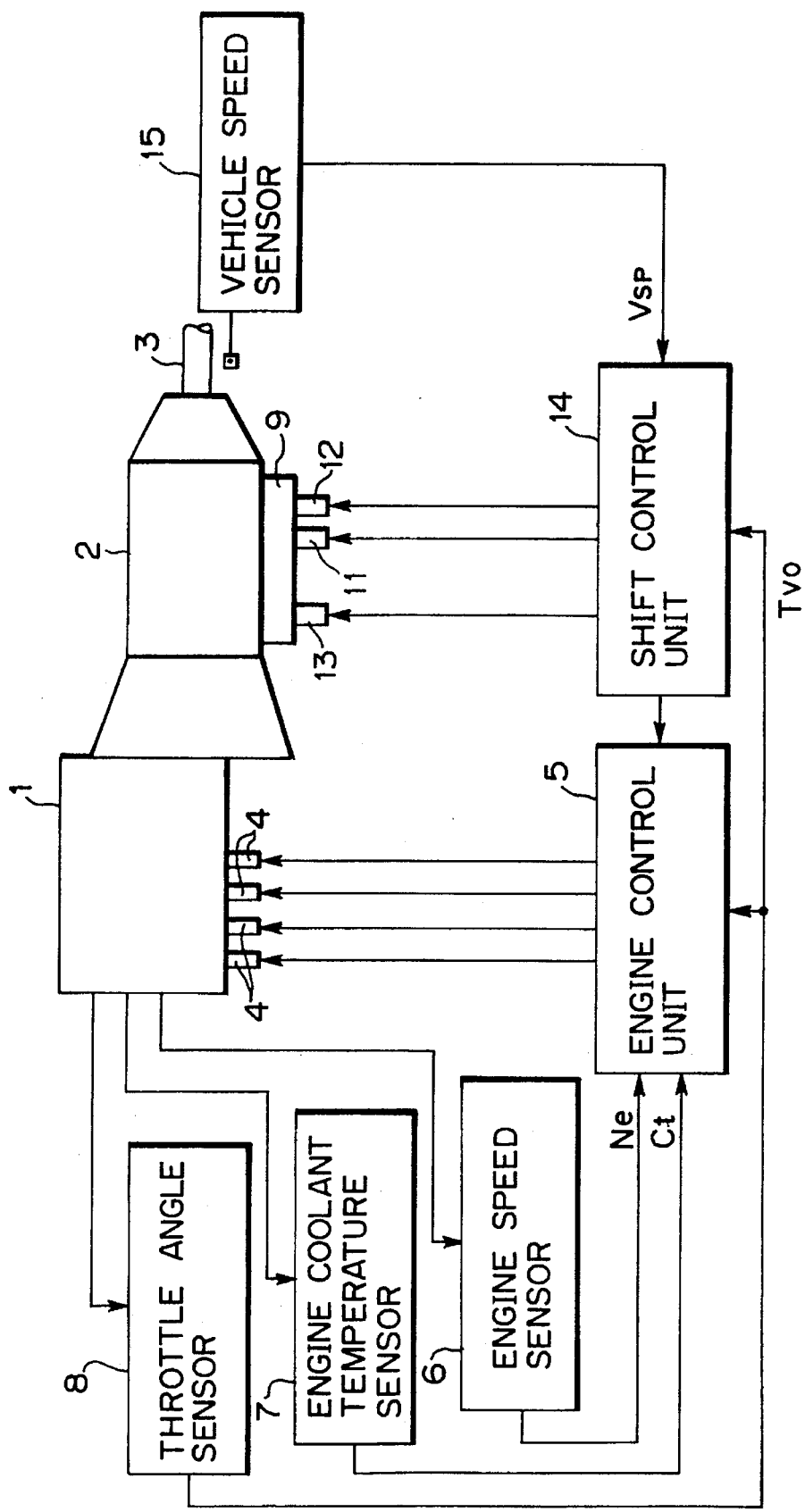
FIG. 2 is a schematic block diagram showing overall construction of an electronic control system for an automatic transmission, in which the preferred embodiments of the shift shock suppressing system is employed.

Referring now to FIG. 2, the preferred embodiment of a shift shock suppressing system according to the present invention is applied for an electronic automatic transmission control system as shown. In FIG. 2, reference numeral 1 denotes an internal combustion engine as a prime mover, and 2 denotes an automatic power transmission. An output torque of the engine 1 is input to the automatic power transmission 2. The automatic power transmission 2 is shiftable among a plurality of transmission-ratios for transmitting the output torque at a selected one of the transmission-ratios to an output shaft 3 for driving a vehicle.

The engine 1 has a plurality of fuel injectors 4 for supplying a controlled amount of fuel to respective engine cylinders. Control of the fuel injection amount for respective fuel injectors 4 is performed by a microcomputer based engine control unit 5. The engine control unit 5 basically calculates a fuel injection amount to be injected on the basis of an engine speed Ne input from an engine speed sensor 6, an engine coolant temperature Ct input from an engine coolant temperature sensor 7 and a throttle valve open angle $T_{vo}$ as an engine load indicative parameter, input from a throttle angle sensor 8. As is well known, an intake air flow rate as measured by an air flow meter or so forth, an induction air pressure as measured by an induction air pressure sensor and so forth may be employed as the engine load indicative parameter in place of the throttle valve open angle $T_{vo}$. Also, as is well known, various additional correction parameters, such as an air/fuel ratio depended feedback parameter (—control correction coefficient), an acceleration enrichment parameter, an air conditioner ON/OFF dependent idle-up parameter, a battery voltage dependent parameter and so forth, may be optionally employed for optimally controlling the engine driving. The fuel injectors are actuated at respective fuel injection timing synchronous with the engine revolution for a period corresponding to the fuel injection amount. In addition, the shown system is further adapted to effect fuel cut-off by maintaining the corresponding fuel injector inoperative at its fuel injection timing, for selected specific engine cylinders for lowering or reducing the engine output torque, as required. Such a partial fuel cut-off operation for lowering of the engine output will be hereinafter referred to as a "torque down".

As can be appreciated, the fuel injectors 4 and the engine control unit 5 form the torque varying means in the preferred embodiment of the shift shock suppressing system.

It should be appreciated that the torque down can also be realized by retarding the ignition in a spark ignition system or by reducing the throttle valve open angle. Therefore, the torque varying means in the preferred embodiment of the shift shock suppressing system should include the above and all possible means for adjusting the engine output torque.

The automatic power transmission 2 has a control valve unit 9 for controlling shift by supplying or stopping the hydraulic pressure to actuators that engage or disengage various friction elements (not shown) of the transmission. The control valve unit 9 includes a first shift solenoid 11, a second shift solenoid 12 and a line pressure solenoid 13. The shift solenoids 11 and 12 establishes a plurality of transmission-ratios by engaging or disengaging a plurality of friction elements according to the following table I, for example. Such transmission-ratios shifting mechanisms and operation are well known in the art. For example, U.S. Pat. No. 4,867,194 discloses a shift control for the automatic power transmission. The disclosure of the above-identified U.S. Patent is herein incorporated by reference.

It should be noted that the line pressure solenoid 13 is adapted to be duty controlled for generating the line pressure.

TABLE 1

| Solenoid Transmission-Ratio | First Shift Solenoid 11 | Second Shift Solenoid 12 |
| --- | --- | --- |
| 1st Speed | ON | ON |
| 2nd Speed | OFF | ON |
| 3rd Speed | OFF | OFF |
| 4th Speed | ON | OFF |

Operations of the shift solenoids 11 and 12 and the line pressure solenoid 13 are controlled by a microcomputer based shift control unit 14. The shift control unit 14 determines an optimal transmission-ratio generally on the basis of the throttle valve open angle $T_{VO}$ obtained from the throttle angle sensor 8 and a vehicle speed Vs obtained from a vehicle speed sensor 15, which detects rotation speed of the transmission output shaft 3 according to a predetermined shift schedule illustrated in FIG. 3. On the basis of the determined transmission-ratio, the shift control unit 14 operates the first and second shift valves 11 and 12 ON or OFF for establishing the corresponding transmission-ratio.

Also, the shift control unit 14 performs a timing control for controlling a timing of complete engagement and disengagement of the friction elements during down-shifting. Furthermore, during down-shifting, the shift control unit 14 issues a command signal to the engine control unit 5 for commanding the torque down in order to suppress a shift shock otherwise caused by abrupt variation of the drive torque. The process of a shift shock suppressing control will be discussed hereinafter.

Figure 4:
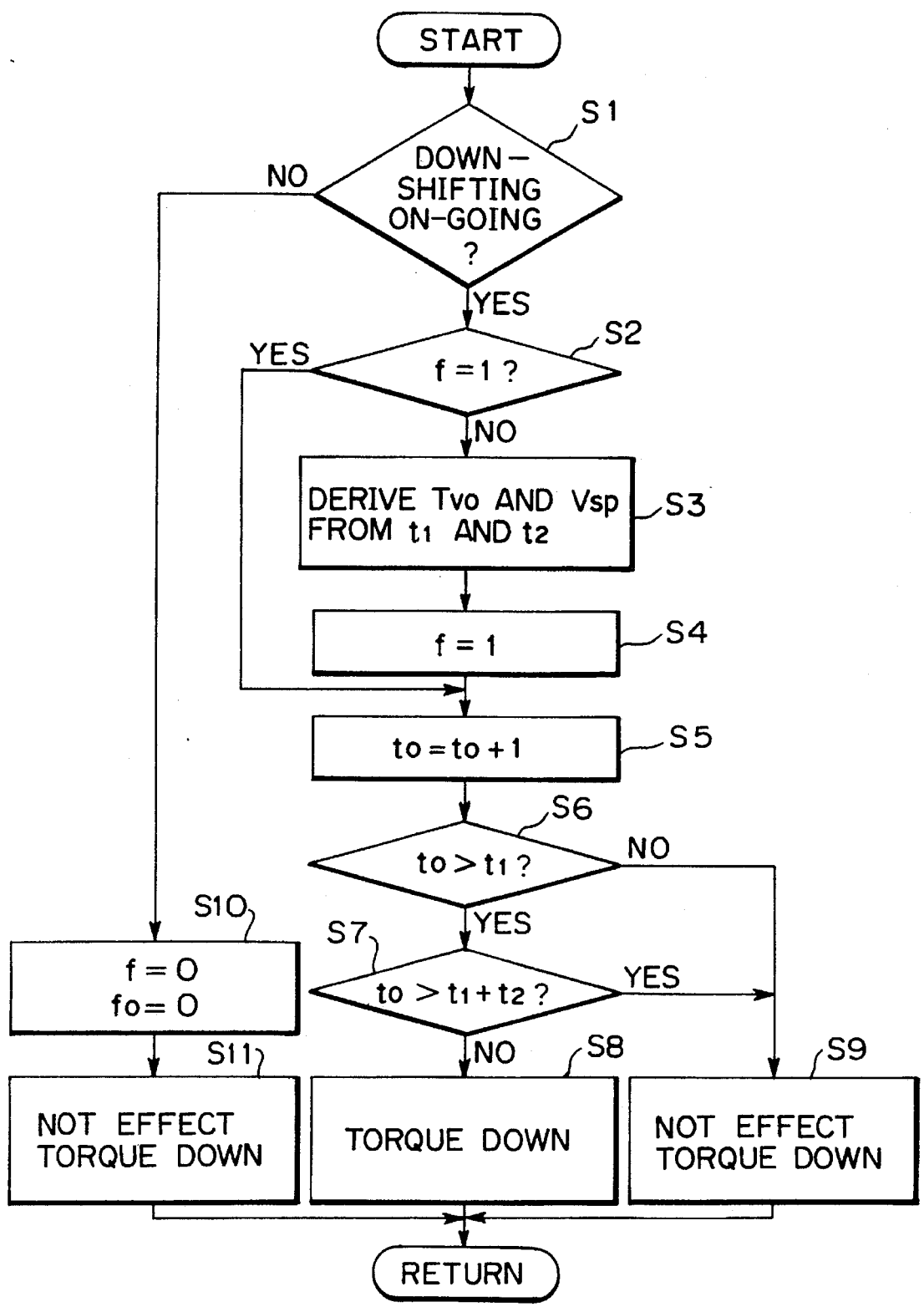
FIG. 4 is a flowchart showing one example of process for shift shock suppressing control to be performed by the shown embodiment of the shift shock suppressing system.

FIG. 4 is a flowchart showing a sequence of the shift shock suppressing control. The shown routine is a timed interrupt routine to be executed at every predetermined interval (e.g. 10 ms). At step S1, a judgement is made whether the on-going control process in a portion performing the shift control in the shift control unit 14 is down-shifting or not. When the answer at step S1 is YES, the process is advanced to step S2 and, otherwise to step S10. As set forth above, the judgement whether the down-shifting control is on-going or not is made on the basis of a signal from the portion performing the shift control within the shift control unit 14 for causing down-shifting (for example, in the case of 4-3 down-shifting, a signal for maintaining the second shift solenoid 12 OFF and switching the first shift solenoid 11 from ON to OFF) and a subsequent signal indicative of termination of a torque down command signal. Here, the down-shifting on-going state represents a state within a period from the issuance of the down-shifting command to the termination of an output of the torque down command signal (mechanical down-shifting operation in the automatic power transmission is completed at a timing $T_2$ set out later). A part of the shift control unit forms the shifting state detecting means in the construction of the shift shock suppressing system according to the invention.

At step S2, a check is performed whether a flag f (set in the later step) is 1 (set) or not. If the answer is YES, the process is advanced to step S5, otherwise to step S3.

Figure 5A:
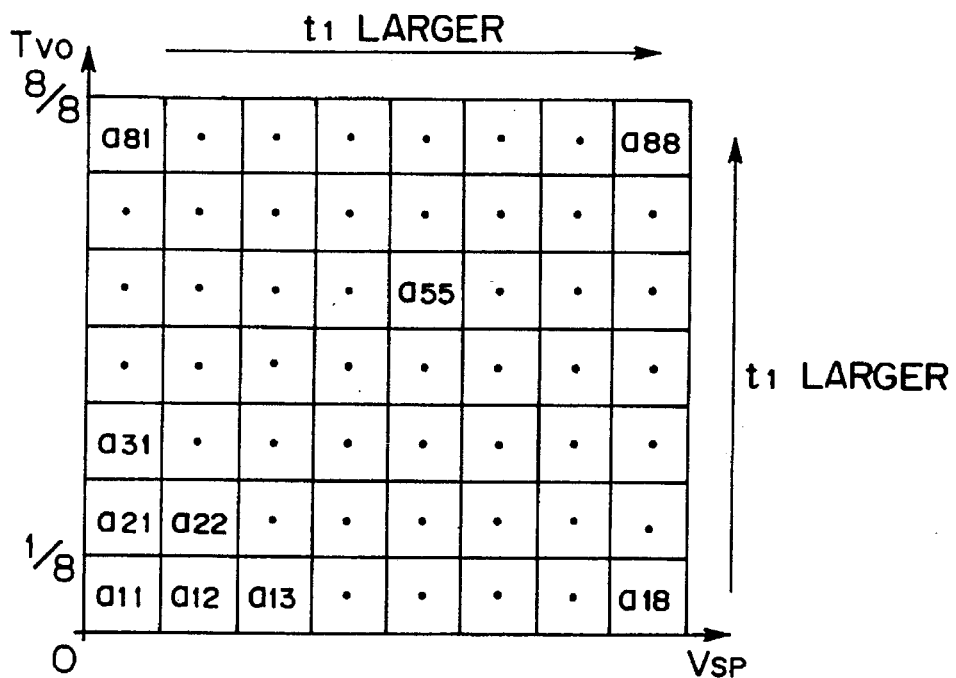
FIGS. 5A and 5B are characteristic charts showing respectively showing a first predetermined period and a second predetermined period.
Figure 5B:
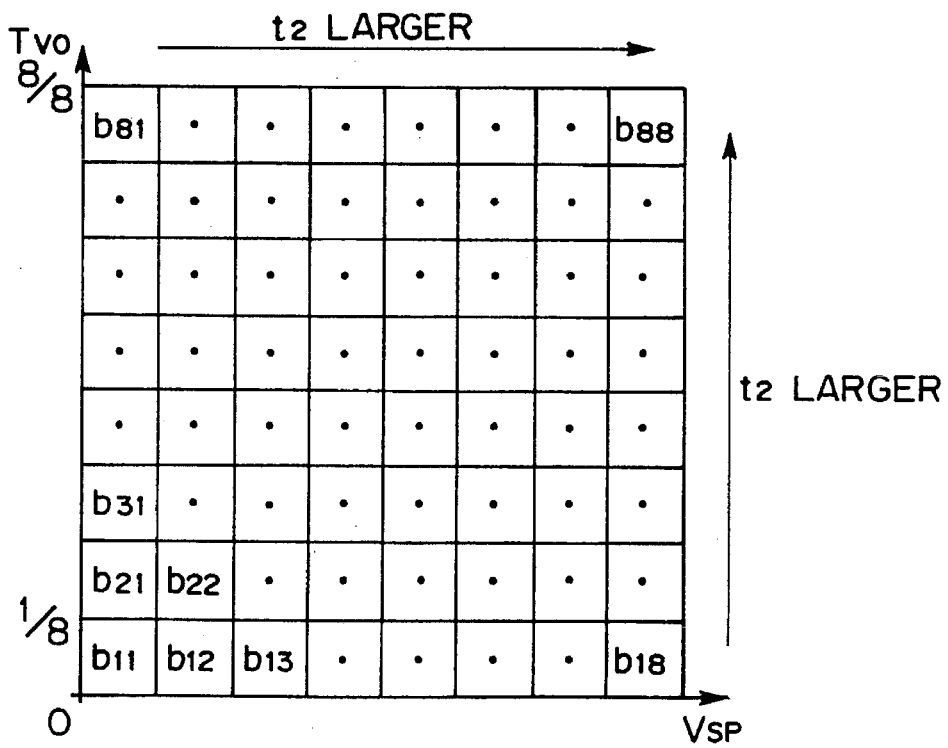

At step S3, a first predetermined period $t_1$ and a second predetermined period $t_2$ are derived on the basis of the current throttle valve open angle $T_{VO}$ and the current vehicle speed $V_{SP}$. In this case, the first and second predetermined periods $t_1$ and $t_2$ are determined according to predetermined characteristics relative to the current throttle valve open angle $T_{VO}$ and the current vehicle speed $V_{SP}$ as illustrated in FIGS. 5A and 5B, respectively, stored in a memory (not shown) in the shift control unit 14. Namely, the first and second predetermined periods $t_1$ and $t_2$ become longer at greater throttle valve open angle $T_{vo}$ (vertical axis) and at higher vehicle speed $V_{sp}$ horizontal axis. As can be seen from FIGS. 5A and 5B, the vertical and horizontal axes are respectively divided into eight segments to respectively define eight ranges in the throttle valve open angle and the vehicle speed. For instance, at the full throttle condition at the highest speed, $t_1$ becomes $a_{88}$ and $t_2$ becomes $b_{88}$. On the other hand, the characteristics are stored in a re-writable memory and updated to optimal values by way of a learning control discussed later.

At step S4, the flag f is set to 1. At the subsequent step S5, measurement of an elapsed time, namely an elapsed time $t_0$ from the initiation of the down-shifting operation, is started.

At step S6, the elapsed time $t_0$ is checked against the first predetermined period $t_1$ whether the first predetermined period $t_1$ is elapsed or not. If the answer at step S6 is YES, the process is advanced to step S7, otherwise to step S9.

At step S7, a check is performed whether the elapsed time $t_0$ exceeds a sum of the first predetermined period $t_1$ and the second predetermined period $t_2$. If the answer is YES, the process is advanced to step S9, otherwise to step S8.

At step S8, a process for outputting a signal commanding torque down operation for the engine control unit 5 is performed. In contrast to this, at step S9, a process not to output the signal commanding torque down is performed.

At step S10, which is reached when the judgement is made that the current operational state is not down-shifting or that the down-shifting control is completed at the judgement step S1, the flag f is set to 0 and the elapsed time $t_0$ is cleared to 0.

At step S11, a process not to output the signal commanding torque down is performed.

The portion of the shift control unit 14 performing the foregoing shift shock suppressing control corresponds to the shift shock suppressing control means in the system according to the invention.

As set forth above, the shift control unit 14 is adapted to perform the learning control for optimally setting the foregoing first predetermined period $t_1$. Next, discussion will be given for the learning control with reference to the flowchart of FIG. 6. It should be noted that the portion of the shift control unit 14 performing the learning control corresponds to the learning control means in the system according to the invention.

Figure 6:
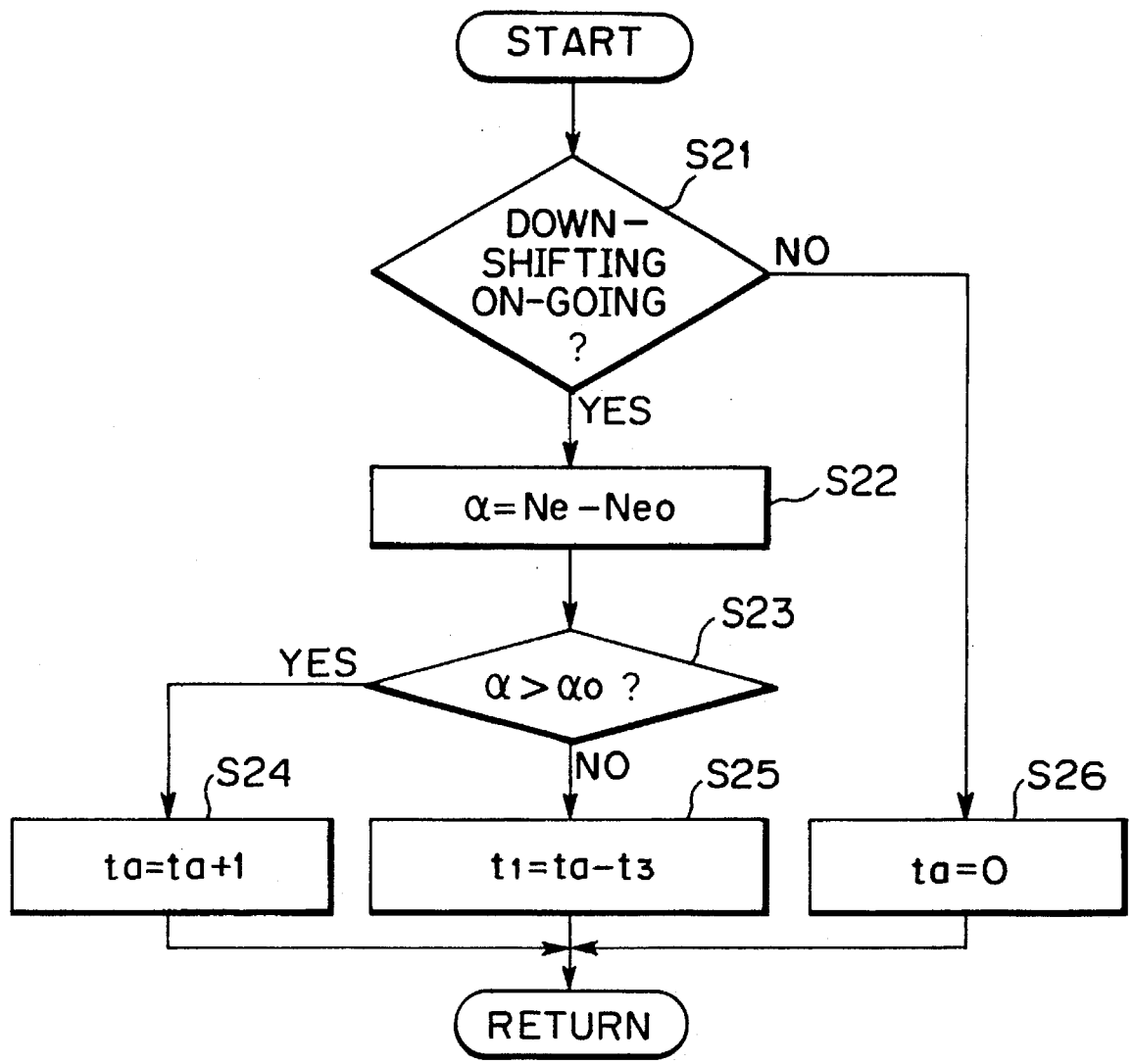
FIG. 6 is a flowchart showing one example of a process of learning control in the shown embodiment.

The learning control process illustrated in FIG. 6 is established as a timed interrupt routine to be executed at every predetermined period, i.e. at every 10 ms. At step S21, a judgement is made whether the current operation status of the shift control system 14 is in the down-shifting control or not. If the answer is YES, the process is advanced to step S22, otherwise to step S26.

At step S22, a variation rate $\alpha$ of the engine speed within a predetermined period (10 ms in the shown embodiment) by subtracting the engine speed Neo obtained in the immediately preceding cycle from the currently obtained engine speed Ne.

At step S23, the currently obtained variation rate $\alpha$ is compared with the variation rate $\alpha_0$ derived in the immediately preceding cycle to check whether the currently derived variation rate $\alpha$ is greater than the variation rate $\alpha_0$ in the immediately preceding cycle. When the answer at step S23 is YES, the process is advanced to step S24, otherwise to step S25.

At step S24, measurement of an elapsed time is started. The period to be measured at this step is a period from the initiation of shifting to the completion of the shifting operation, i.e. shifting period $t_a$.

Figure 7:
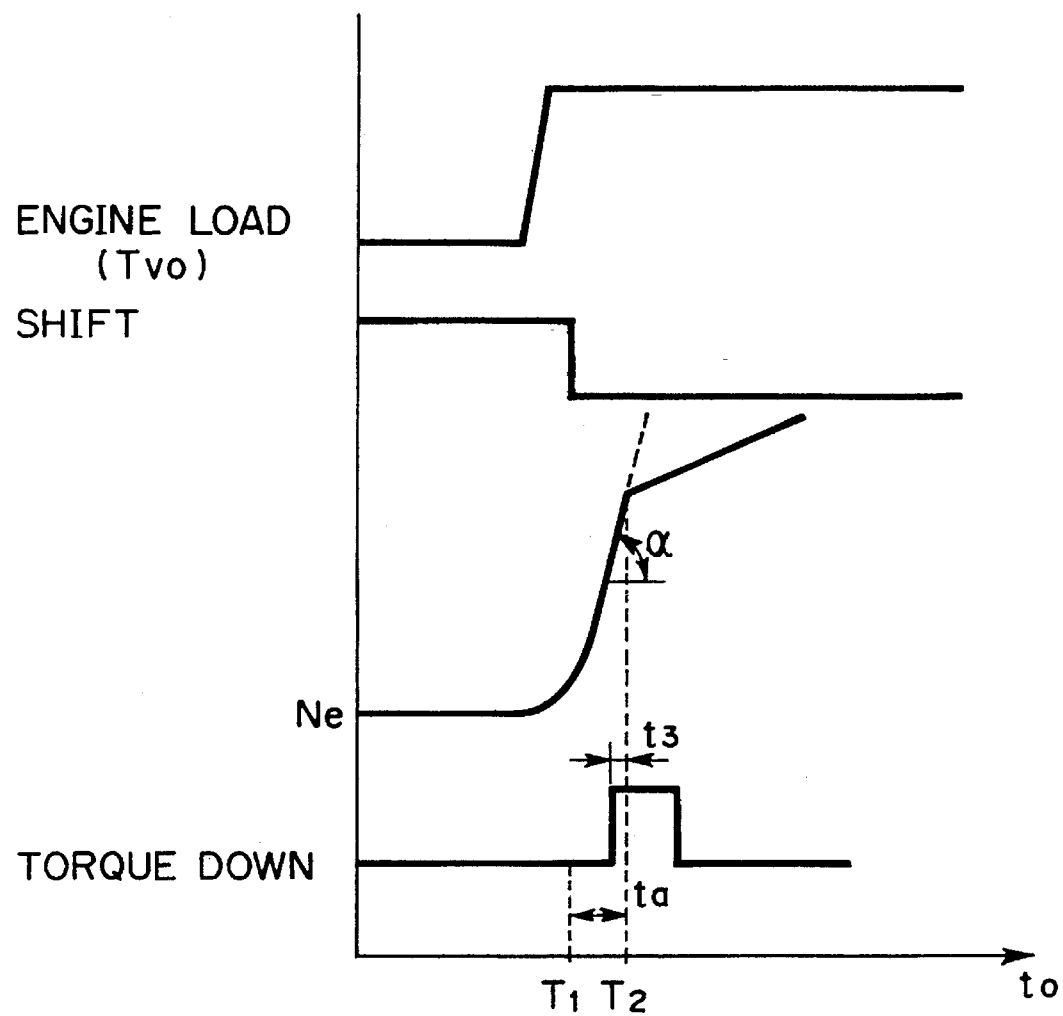
FIG. 7 is a timing chart for explaining a third predetermined period in the shown embodiment.

At step S25, a process for setting the first predetermined period $t_1$ at a value derived by subtracting a third predetermined period $t_3$ from the shifting period $t_a$. The third predetermined value $t_3$ is set at a quite short but constant period as shown in the timing chart of FIG. 7. Namely, in order to obtain an ideal shock condition in down-shifting, it is necessary to initiate the torque down immediately before the completion of shifting (for example, approximately 0.1 sec. before the completion of shifting). Therefore, the third predetermined period $t_3$ is preliminarily set at a value to set the torque down initiation timing at an optimal timing. Completion of the shifting operation can be judged by detecting the current variation rate $\alpha$ of the engine speed Ne smaller than the variation rate $\alpha_0$ in the immediately preceding cycle. With the new value of the first predetermined period $t_1$ derived as set forth above, the value of FIG. 5A is updated.

At step S26, a process for clearing the shifting period $t_a$ to 0 is performed.

Next, discussion will be given for the operation of down-shifting in the shown embodiment of the automatic power transmission.

Figure 3:
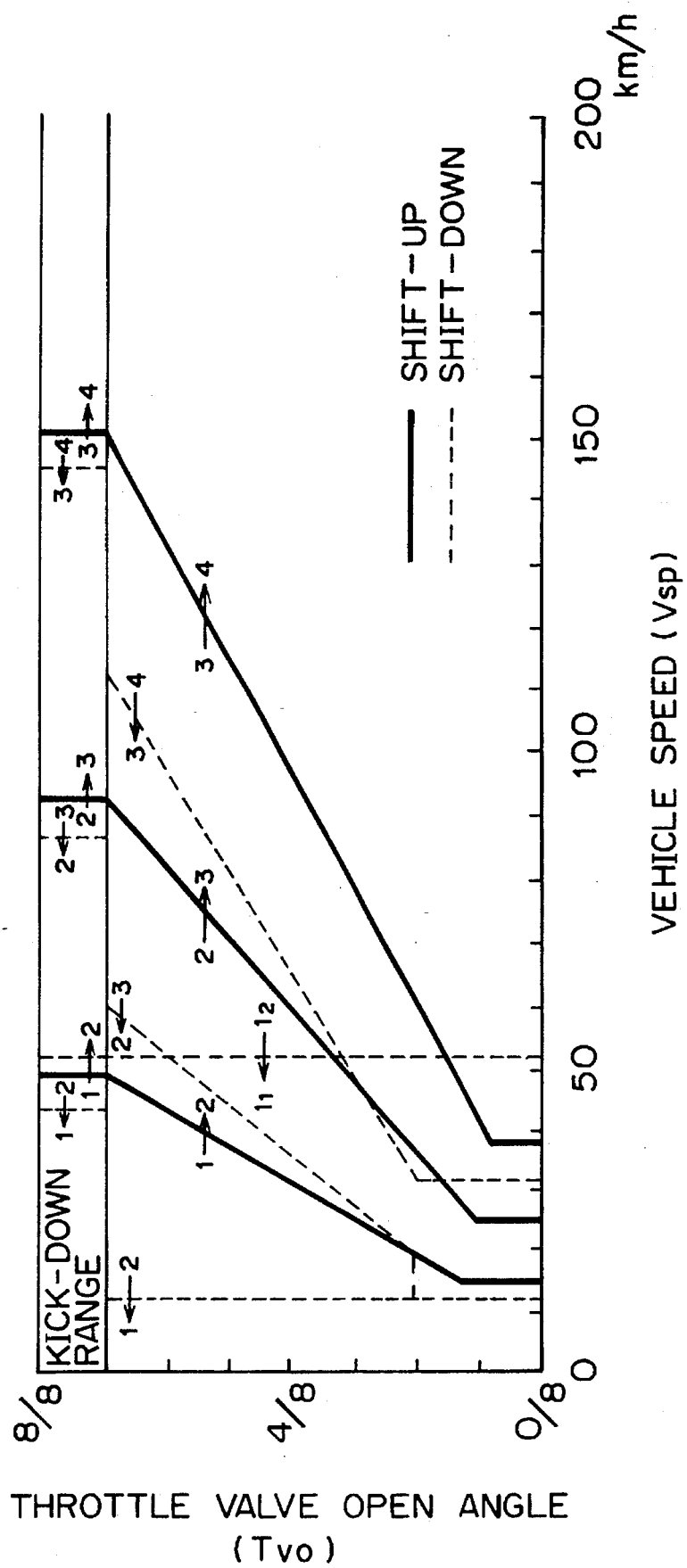
FIG. 3 is a chart showing a shift schedule employed in the shown electronic automatic transmission control system.
Figure 8:
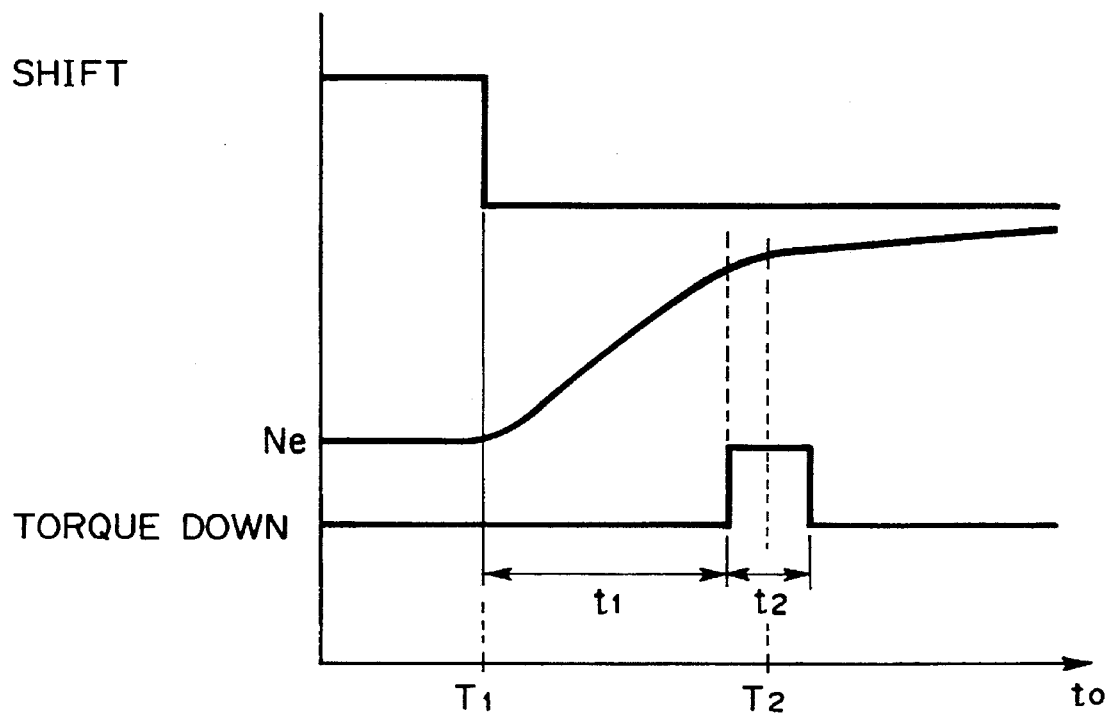
FIG. 8 is a timing chart showing an operation of the shown embodiment of the shift shock suppressing system according to the invention.
Figure 9A:
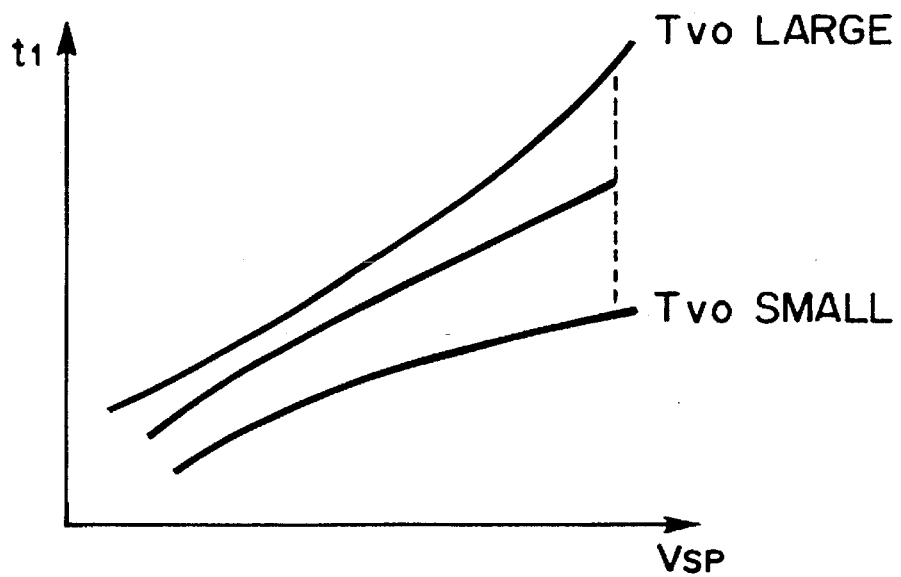
FIGS. 9A and 9B are timing charts showing another example of characteristics of the first and second predetermined periods in the shown embodiment.
Figure 9B:
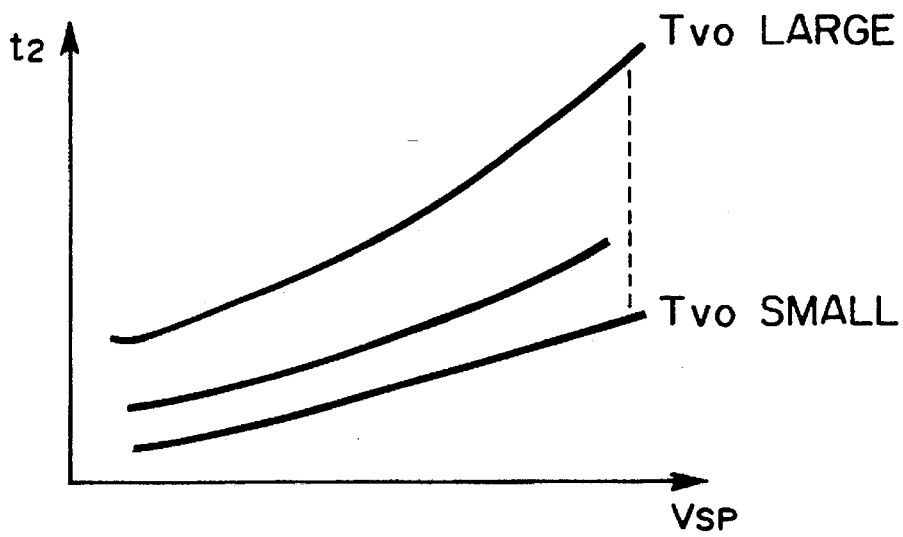

According to the shift schedule shown in FIG. 3, when the relationship between the throttle valve open angle $T_{VO}$ and the vehicle speed $V_{SP}$ is changed into the state to effect down-shifting, the shift control unit 14 outputs signals for switching ON and OFF the shift solenoids 11 and 12 of the control valve unit 9 for engaging and disengaging friction elements (not shown). The first output of these signals is carried out at a timing $T_1$ in the timing chart of FIG. 8 to initiate the down-shifting control. Once the down-shifting control is initiated, the engine speed Ne begins to increase.

Also, when the down-shifting control is initiated, the shift control unit 14 instantly initiates the shift shock suppressing control illustrated in the flowchart of FIG. 4i (Steps S1 to S2) in parallel to the down-shifting control. At this time, on the basis of the throttle valve open angle $T_{VO}$ and the vehicle speed $V_{SP}$ and according to the characteristics of FIGS. 5A and 5B, the first predetermined period $t_1$ and the second predetermined period $t_2$ are derived (step S3).

Then, when the first predetermined period $t_1$ is elapsed from the initiation of down-shifting, the signal commanding torque down is output to the engine control unit 5 for the second predetermined period $t_2$. The torque down control is initiated immediately before a timing T2 where the down-shifting is mechanically completed in the automatic transmission since the first predetermined period $t_1$ for initiating the torque down control is set to be elapsed immediately before (the third predetermined period $t_3$ ahead) the timing T2 through learning of the flowchart in FIG. 6.

By initiation of torque down immediately before completion of down-shifting at the timing T2, a shift shock can be suppressed. In the shift shock suppressing control, since the timing of initiation of torque down is determined on the basis of the elapsed time $t_0$ from initiation of the down-shifting control, the means for detecting the rotation speed of the input shift of the automatic transmission, such as a turbine sensor as required in the prior art, in which the torque down control is performed on the basis of the transmission-ratios of the automatic transmission, becomes unnecessary. Accordingly, production costs can be reduced by reduction of the number of required parts. Furthermore, since it does not require the input speed detecting means, installation space therefor becomes unnecessary, modification of the transmission casing, the oil pump and so forth becomes unnecessary so as to facilitate application of the present invention for the existing automatic transmission control systems. Therefore, further cost down can be expected.

Also, while the shown embodiment controls the timing of initiation of the torque down on the basis of the elapsed period from initiation of the down-shifting control (i.e. on the basis of the first and second predetermined periods $t_1$ and $t_2$), since these predetermined periods $t_1$ and $t_2$ are set on the basis of the vehicle speed $V_{SP}$ and the throttle valve open angle $T_{VO}$, the timing of initiation of the torque down can be precisely adjusted relative to the completion timing of down-shifting. Furthermore, in the shown embodiment, since the first predetermined period $t_1$ for defining the initiation timing of the torque down operation is corrected through learning control shown by the flowchart in FIG. 6 at every occurrence of down-shifting, further precise initiation timing control for torque down can be achieved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, while the shown embodiment determines the first and second predetermined periods $t_1$ and $t_2$ for defining initiation and termination timings of the torque down control and thus defines the periods to perform torque down according to the characteristics shown in FIGS. 5A and 5B in terms of the throttle valve open angle $T_{VO}$ and the vehicle speed VSP, types of shifting may also be taken into account. In such a case, the characteristics may be set for respective types of shifting, e.g. 4-3 down-shifting, 4-2 down-shifting or so forth. The characteristics thus set may be stored in the memory of the shift control unit 14.

Also, instead of setting the predetermined periods $t_1$ and $t_2$ in stepwise fashion, these periods may be set to be proportional to the throttle open angle $T_{VO}$ and the vehicle speed $V_{SP}$.

The present invention has been described in detail with respect to preferred embodiments, and it will now be that changes and modifications may be made without departing from the invention in its broader aspects, and it is the intention, therefore, in the appended claims to cover all such changes and modifications as falling within the true spirit of the invention.

What is claimed is:

1. A shift shock suppressing system for an automotive power train including an engine and an automatic transmission mounted on a vehicle, comprising:

shifting control means for performing shift control for said automatic transmission depending upon an operating condition of the engine and a traveling condition of the vehicle;

torque varying means for varying an output torque of the engine;

shifting state detecting means for detecting on-going shifting state of the automatic transmission controlled by said shift control means;

shift shock suppression control means for outputting a command lowering of the output torque of said engine to said torque varying means when initiating of down-shifting is detected by said shifting state detecting means, and when a first predetermined period is elapsed from detection of initiation of down-shifting, and maintaining the command for a second predetermined period;

arithmetic means for deriving a variation rate of an engine speed after initiation of down-shifting;

judgement means for judging whether a down-shifting is completed on the basis of an input from said arithmetic means;

measuring means for measuring a shifting period as a period from initiation of down-shifting to completion of down-shifting as judged by said judgement means; and learning control means for modifying said first predetermined period with a value derived by subtracting a preliminarily set third predetermined period from said shifting period derived by said measuring means.

2. A shift shock suppressing system as claimed in claim 1, wherein said judgement means makes judgement that down-shifting is completed when the current variation rate becomes smaller than the variation rate in the immediately preceding cycle.

3. A shift shock suppressing system as claimed in claim 1, wherein said first predetermined period is preliminarily set to be a period from detection of initiation of down-shifting to immediately before completion of down-shifting, and said first predetermined period is updated by said learning control means and stored in the memory at every occurrence of down-shifting.

4. A shift shock suppressing system as claimed in claim 3, wherein said second predetermined period is set to be a period from a timing immediately before completion of down-shifting to a predetermined timing after completion of down-shifting, and is stored in the memory.

5. A shift shock suppressing system as claimed in claim 3, wherein at least one of said first and second predetermined periods is preliminarily set corresponding to a load condition on the engine.

6. A shift shock suppressing system as claimed in claim 3, wherein at least one of said first and second predetermining periods is preliminarily set corresponding to a vehicle speed.

7. A shift shock suppressing system as claimed in claim 3, wherein at least one of said first and second predetermined periods is preliminarily set corresponding to a load condition of the engine and a vehicle speed.

8. A shift shock suppressing system as claimed in claim 3, wherein at least one of said first and second predetermined periods is preliminarily set corresponding to types of shifting of the automatic transmission.

9. A shift shock suppressing system as claimed in claim 3, wherein at least one of said first and second predetermined periods is set to be longer at greater engine load condition and at higher vehicle speed, respectively.

* * * * *